United States Patent
Ginsberg et al.

(10) Patent No.: US 10,669,122 B2
(45) Date of Patent: Jun. 2, 2020

(54) SERVICE TOOL LOCATION-BASED FUNCTION AVAILABILITY

(71) Applicant: OTIS ELEVATOR COMPANY, Farmington, CT (US)

(72) Inventors: David Ginsberg, Granby, CT (US); Mark Olthuis, Avon, CT (US); Fred G. Williams, Old Saybrook, CT (US); Jody Phouthavong, Stratford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 330 days.

(21) Appl. No.: 15/651,434

(22) Filed: Jul. 17, 2017

(65) Prior Publication Data

US 2019/0016560 A1    Jan. 17, 2019

(51) Int. Cl.
  *B66B 5/00*  (2006.01)
  *B66B 1/28*  (2006.01)
  *H04W 4/02*  (2018.01)
(52) U.S. Cl.
  CPC .............. *B66B 5/0087* (2013.01); *B66B 1/28* (2013.01); *H04W 4/023* (2013.01)
(58) Field of Classification Search
  CPC ................................ B66B 5/0087; B66B 1/28
  USPC .......................................................... 187/247
  See application file for complete search history.

(56) References Cited

U.S. PATENT DOCUMENTS

| | | | |
|---|---|---|---|
| 6,571,103 B1 | 5/2003 | Novakov | |
| 6,845,400 B2 * | 1/2005 | Macpherson | ..... H04L 29/12009 709/227 |
| 7,426,981 B2 | 9/2008 | Bacellar et al. | |
| 7,699,143 B2 | 4/2010 | Tschuemperlin et al. | |
| 7,715,831 B2 | 5/2010 | Wakefield | |
| 8,028,807 B2 | 10/2011 | Deplazes et al. | |
| 8,145,199 B2 | 3/2012 | Tadayon et al. | |
| 8,285,223 B2 | 10/2012 | Unger | |
| 8,651,242 B2 | 2/2014 | Sarjanen | |
| 8,712,686 B2 | 4/2014 | Bandyopadhyay et al. | |
| 8,813,917 B2 | 8/2014 | Salmikuukka et al. | |
| 8,937,534 B2 | 1/2015 | Kreiner et al. | |

(Continued)

FOREIGN PATENT DOCUMENTS

| | | |
|---|---|---|
| EP | 2671836 | 2/2011 |
| EP | 1750573 | 4/2011 |

(Continued)

OTHER PUBLICATIONS

EP Application No. 18184053.9 Extended EP Search Report dated Nov. 7, 2018, 7 pages.

(Continued)

*Primary Examiner* — David S Warren
(74) *Attorney, Agent, or Firm* — Cantor Colburn LLP (57) ABSTRACT

A service tool function availability adjustment system includes a storage medium operable to store a location-based function availability map and at least one processor configured to determine a location of a service tool in relation to one or more equipment components of an equipment service system. The at least one processor configures an availability of one or more functions of the service tool to interact with the one or more equipment components of the equipment service system based on the location-based function availability map and the location of the service tool.

20 Claims, 5 Drawing Sheets

(56) References Cited

U.S. PATENT DOCUMENTS

| | | | |
|---|---|---|---|
| 9,110,159 B2 | 8/2015 | Vartanian et al. | |
| 9,391,782 B1 | 7/2016 | Mironenko | |
| 9,403,663 B2 | 8/2016 | Dellarippa et al. | |
| 9,418,115 B2* | 8/2016 | Ganick | H04B 10/1149 |
| 9,485,628 B2 | 11/2016 | Lee et al. | |
| 9,497,311 B2 | 11/2016 | Salmenkaita et al. | |
| 9,541,905 B2 | 1/2017 | Nixon et al. | |
| 9,592,993 B2 | 3/2017 | Joyce et al. | |
| 9,626,647 B2 | 4/2017 | Pierce et al. | |
| 10,252,881 B2* | 4/2019 | Hiltunen | H04W 4/80 |
| 2003/0043073 A1 | 3/2003 | Gray et al. | |
| 2004/0176958 A1 | 9/2004 | Salmenkaita et al. | |
| 2006/0144646 A1 | 7/2006 | Engel et al. | |
| 2007/0001904 A1 | 1/2007 | Mendelson | |
| 2010/0292556 A1* | 11/2010 | Golden | A61B 5/7465 |
| | | | 600/364 |
| 2011/0121963 A1* | 5/2011 | Prehofer | H04W 4/021 |
| | | | 340/539.13 |
| 2011/0151963 A1 | 5/2011 | Prehofer | |
| 2011/0218730 A1 | 9/2011 | Rider et al. | |
| 2011/0231020 A1 | 9/2011 | Ramachandran et al. | |
| 2013/0045685 A1 | 2/2013 | Kiani | |
| 2013/0103947 A1 | 4/2013 | Epstein | |
| 2013/0179285 A1* | 7/2013 | Lyle | G06Q 30/06 |
| | | | 705/26.1 |
| 2013/0244615 A1 | 9/2013 | Miller | |
| 2013/0246928 A1 | 9/2013 | Hovi et al. | |
| 2014/0045430 A1 | 2/2014 | Kim | |
| 2014/0069745 A1 | 3/2014 | Dellarippa et al. | |
| 2014/0355389 A1 | 12/2014 | Reunamaki et al. | |
| 2015/0089607 A1 | 3/2015 | Hubner et al. | |
| 2015/0235489 A1 | 8/2015 | Vardi et al. | |
| 2015/0251875 A1 | 9/2015 | Lustenberger | |
| 2015/0274214 A1 | 10/2015 | Park et al. | |
| 2015/0284214 A1 | 10/2015 | Park et al. | |
| 2016/0004871 A1 | 1/2016 | Guedalia et al. | |
| 2016/0134686 A1 | 5/2016 | Youker et al. | |
| 2016/0207735 A1 | 7/2016 | Elomaa et al. | |
| 2016/0212147 A1* | 7/2016 | Palin | H04L 63/062 |
| 2017/0013409 A1 | 1/2017 | Cerchio et al. | |
| 2017/0223527 A1* | 8/2017 | Zhai | H04W 48/04 |
| 2017/0230378 A1 | 8/2017 | Bliss | |
| 2017/0286878 A1* | 10/2017 | Mason | G06F 3/04817 |
| 2018/0072535 A1* | 3/2018 | Hiltunen | H04W 4/80 |
| 2018/0091413 A1* | 3/2018 | Richards | H04L 12/4641 |
| 2018/0270324 A1* | 9/2018 | Yang | H04W 4/70 |
| 2018/0322027 A1* | 11/2018 | Padaki | G06F 11/368 |
| 2019/0016560 A1* | 1/2019 | Ginsberg | H04W 4/023 |
| 2019/0020971 A1 | 1/2019 | Ginsberg et al. | |
| 2019/0023528 A1* | 1/2019 | Franco | B66B 1/468 |
| 2019/0028552 A1* | 1/2019 | Johnson, II | H04L 45/306 |
| 2019/0043281 A1* | 2/2019 | Aman | A63G 31/16 |
| 2019/0150055 A1* | 5/2019 | Kodaypak | H04W 4/70 |
| 2019/0161318 A1* | 5/2019 | Wedzikowski | B66B 1/468 |
| 2019/0174208 A1* | 6/2019 | Speicher | G06F 13/20 |
| 2019/0295551 A1* | 9/2019 | White | G10L 15/265 |

FOREIGN PATENT DOCUMENTS

| | | |
|---|---|---|
| EP | 3128382 | 2/2017 |
| JP | 6013270 | 12/2014 |
| KR | 20130087254 | 8/2013 |
| WO | 2015008749 A1 | 1/2015 |
| WO | 2017112659 A1 | 6/2017 |

OTHER PUBLICATIONS

EP Application No. 18184055.4 Extended EP Search Report dated Sep. 21, 2018, 7 pages.

Dexdyne "Remote Life & Elevator Monitoring Solution" Jan. 3, 2015, 2 pages.

E Costa-Montenegro, et al., "QR-Maps: an Efficient Tool for Indoor User Location Based on QR-Codes and Google Maps," The 8th Annual IEEE Consumer Communications & Networking Conf, Jan. 2011, 5 pages.

V. Vasudevan, Glassbeam "Remote maintenance of escalators and elevators using log analytics" Feb. 27, 2015, 3 pages.

Y. Lin, et al., "A Simulatin Model for Field Service With Condition-Based Maintenance," Proceedings of the 2002 Winter Simulation Conference, Dec. 2002, 6 pages.

EP Application No. 18184055.4 Office Action dated Jan. 28, 2020, 3 pages.

* cited by examiner

SERVICE TOOL LOCATION-BASED FUNCTION AVAILABILITY

BACKGROUND

The present disclosure relates to equipment service systems, and more particularly, to service tool equipment service systems.

Current service tools used for accessing equipment controllers (e.g., elevator controllers) typically rely on using a separate hardware tool that physically plugs into an equipment control system. The physical connection ensures that the service tool is used by an individual who is physically present at a specific location when using the service tool. Being physically present helps to ensure that a user of the service tool can observe environmental conditions, such as the presence of other people. As networked/wireless service tools are used in place of physically connected service tools, the service tools may not need to be physically present at the location of the equipment.

BRIEF DESCRIPTION

According to some embodiments, a service tool function availability adjustment system is provided. The service tool function availability adjustment system includes a storage medium operable to store a location-based function availability map and at least one processor configured to determine a location of a service tool in relation to one or more equipment components of an equipment service system. The at least one processor configures an availability of one or more functions of the service tool to interact with the one or more equipment components of the equipment service system based on the location-based function availability map and the location of the service tool.

In addition to one or more of the features described above or below, or as an alternative, further embodiments may include where the one or more functions include at least one control function of the one or more equipment components and at least one monitoring function of the one or more equipment components.

In addition to one or more of the features described above or below, or as an alternative, further embodiments may include where the location-based function availability map defines the availability of the one or more functions of the service tool for a plurality of predetermined service locations.

In addition to one or more of the features described above or below, or as an alternative, further embodiments may include where the one or more functions of the service tool provide access to one or more functions of an equipment controller of the equipment service system.

In addition to one or more of the features described above or below, or as an alternative, further embodiments may include where the equipment controller is an elevator controller, and the one or more equipment components comprise one or more elevator components.

In addition to one or more of the features described above or below, or as an alternative, further embodiments may include where the service tool and the equipment controller establish communication using a wireless link.

In addition to one or more of the features described above or below, or as an alternative, further embodiments may include where the service tool blocks access to one or more control functions of the one or more equipment components when the service tool is determined to be at an offsite location with respect to the one or more equipment components.

In addition to one or more of the features described above or below, or as an alternative, further embodiments may include where the equipment controller verifies the location of the service tool.

In addition to one or more of the features described above or below, or as an alternative, further embodiments may include where the location is verified through one or more of: a sequence to be entered through a user interface, a code to be captured as image data, a code to be entered through the service tool, an audio code to be captured as audio data, an audio prompt to elicit an expected response, communication using a local-only wireless link, and exchanged location information.

In addition to one or more of the features described above or below, or as an alternative, further embodiments may include where a remote server verifies the location of the service tool.

According to some embodiments, a method of service tool function availability adjustment is provided. The method includes determining a location of a service tool in relation to one or more equipment components of an equipment service system, and configuring an availability of one or more functions of the service tool to interact with the one or more equipment components of the equipment service system based on the location of the service tool.

Technical effects of embodiments of the present disclosure include adjusting function availability of a service tool responsive to the service tool location with respect to one or more predetermined service locations of an equipment service system.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A detailed description of one or more embodiments of the disclosed apparatus and method are presented herein by way of exemplification and not limitation with reference to the Figures.

Figure 1:
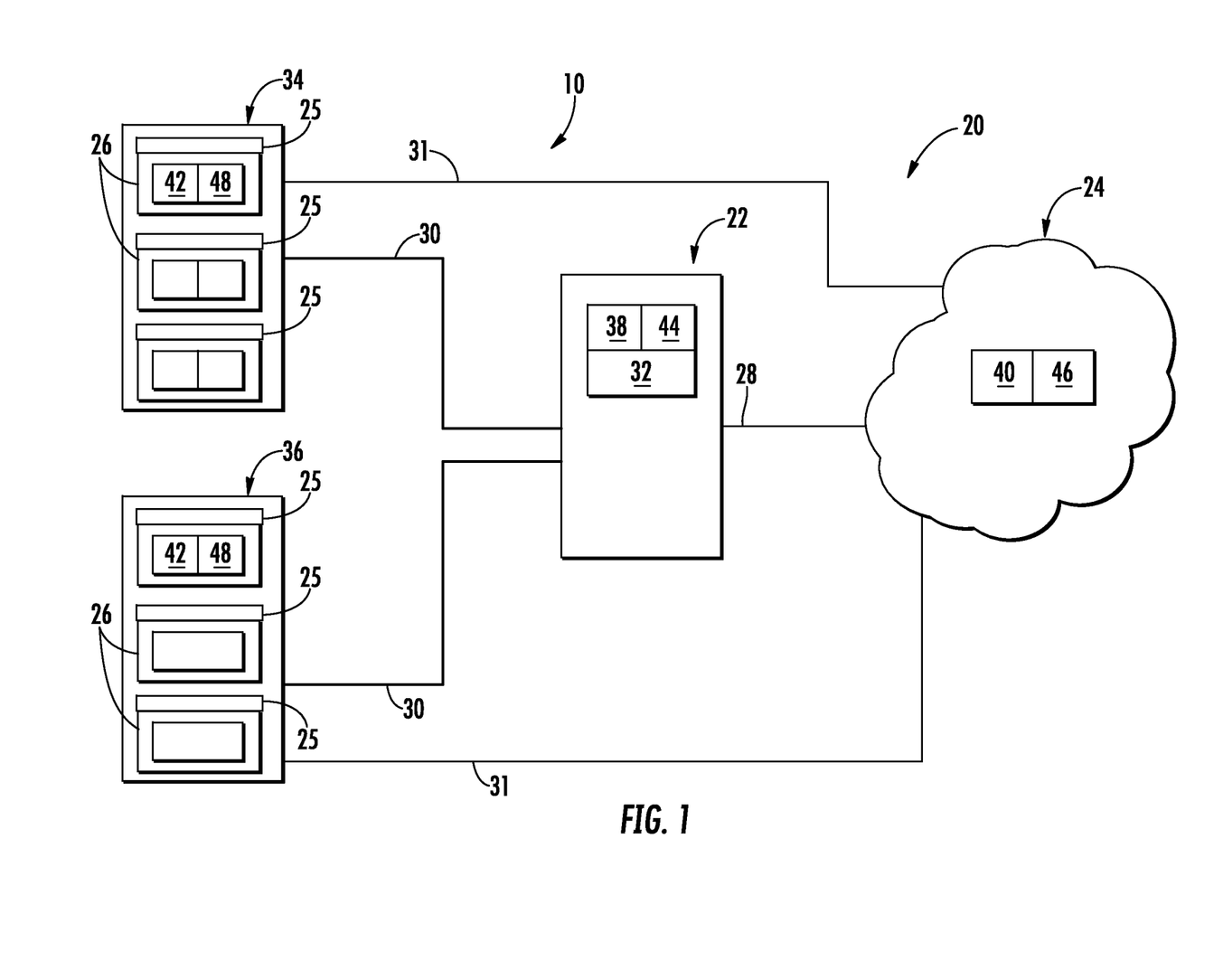
FIG. 1 is a schematic illustration of an equipment service system as one, non-limiting, exemplary embodiment of the present disclosure.

Referring to FIG. 1, an exemplary embodiment of an equipment service system 20, which may include, or may use portions of, a service tool 22, a remote server 24, and at least one equipment controller 26. The service tool 22 may communicate with the remote server 24 and/or the equipment controller 26 over respective communication pathways 28, 30. The communication pathways 28, 30 may be associated with such communication protocols as Bluetooth®, Wi-Fi, Near Field Communications (NFC), infrared, mobile broadband (e.g., 3G, 4G, etc.), satellite, and others. The remote server 24 can facilitate communication between the equipment controller 26 and the service tool 22. One or more communication pathways 31 between the remote server 24 and equipment controller 26 can enable remote access, for instance, when the service tool 22 is unable to establish communication pathway 30. Thus, information can flow over communication pathways 28 and 31, or a direct link can be established between the equipment controller 26 and the service tool 22 using communication pathway 30. Communication pathway 31 can use a different protocol for longer distance secure communication than protocols used by communication pathways 28 and 30, for example.

The service tool 22 may include a user interface 32 that facilitates system interaction with a user (e.g., an equipment repairperson/service technician). Non-limiting examples of the service tool 22 may include a smartphone, a tablet computer, laptop computer, and other electronic devices. The remote server 24 may be cloud-based (i.e., in a cloud network environment). The equipment service system 20 generally controls the flow of information between the service tool 22, the remote server 24 and/or the equipment controller 26. In some embodiments, the service tool 22 may provide an interface to one or more remotely executed applications with reduced local code execution. In one embodiment, the remote server 24 and the equipment controller 26 may be owned and/or controlled by a common company.

The equipment service system 20 may further include at least one site (i.e., two illustrated as 34, 36 in FIG. 1). Each site 34, 36 may include at least one equipment controller 26 (i.e., three illustrated for each site 34, 36) operable to control one or more equipment components 25. Non-limiting examples of sites 34, 36 may be a building, a set of floors within a building, a portion of a floor within a building, a collection of buildings, and others. A non-limiting example of an equipment controller 26 may be an elevator controller that can be serviced by the manufacturer of the elevator, and the one or more equipment components 25 can be one or more elevator components. The service tool 22, the remote server 24, and the equipment controller 26 may each include respective processors 38, 40, 42 (e.g., microprocessors), and storage mediums 44, 46, 48 that may be computer writeable and readable.

In the example of FIG. 1, a service tool function availability adjustment system 10 can include the service tool 22 and the equipment controller 26, where various location-based operations can be distributed between either or both of the service tool 22 and the equipment controller 26. For example, at least one processor 38 of the service tool 22 can determine whether the service tool 22 is located at a predetermined service location of an equipment service system 20 and/or at least one processor 42 of the equipment controller 26 can determine/confirm the location of the service tool 22. Further, the remote server 24 may also determine or verify the location of the service tool 22. One or more location determination techniques can be employed, such as use of global positioning system (GPS) data, network address information, and proximity detection. For instance, a location proximity indicator can be generated and encoded in different forms such as characters, numbers, symbols, light patterns, images, audio, and the like to determine whether the service tool 22 is located local to the predetermined service location based on verifying that a response to the location proximity indicator matches an expected response. The predetermined service location can be defined in terms of being "local" or "remote", e.g., at one of the sites 34, 36 or not at one of the sites 34, 36. For instance, if the service tool 22 is locally at site 34, then the service tool 22 may be considered remote from site 36. "Local" can be defined being on-site (e.g., within a building) or proximate to a predetermined location depending upon the technology used, such as a location where the location proximity indicator can be seen, heard, or otherwise observed. For instance, when proximity detection requires physical interaction or direct audio/visual confirmation, then "local" is defined as being at a location where such interactions are detectable. If a wider area of coverage is provided for proximity detection, such as a Wi-Fi connection, then "local" can be defined as being within signal communication range for direct wireless communication. "Remote" can be defined as an off-site location or out of range for verifying proximity, such as outside of a range of direct physical interaction, audio/visual detection, and/or beyond a transmission range. The service tool 22 can also have various locations within the "local" category, which may further refine the location. For example, the service tool 22 may be local to a room within a building but remote from the equipment controller 26 in the same building. In some instances, the service tool 22 may be remote from both sites 34, 36. The remote server 24 can be used to establish remote access to sites 34, 36 and/or provide authentication services. More precise location mapping can be used to provide fine-tuned function availability adjustments using, for instance, a location-based function availability map as further described herein.

Figure 2:
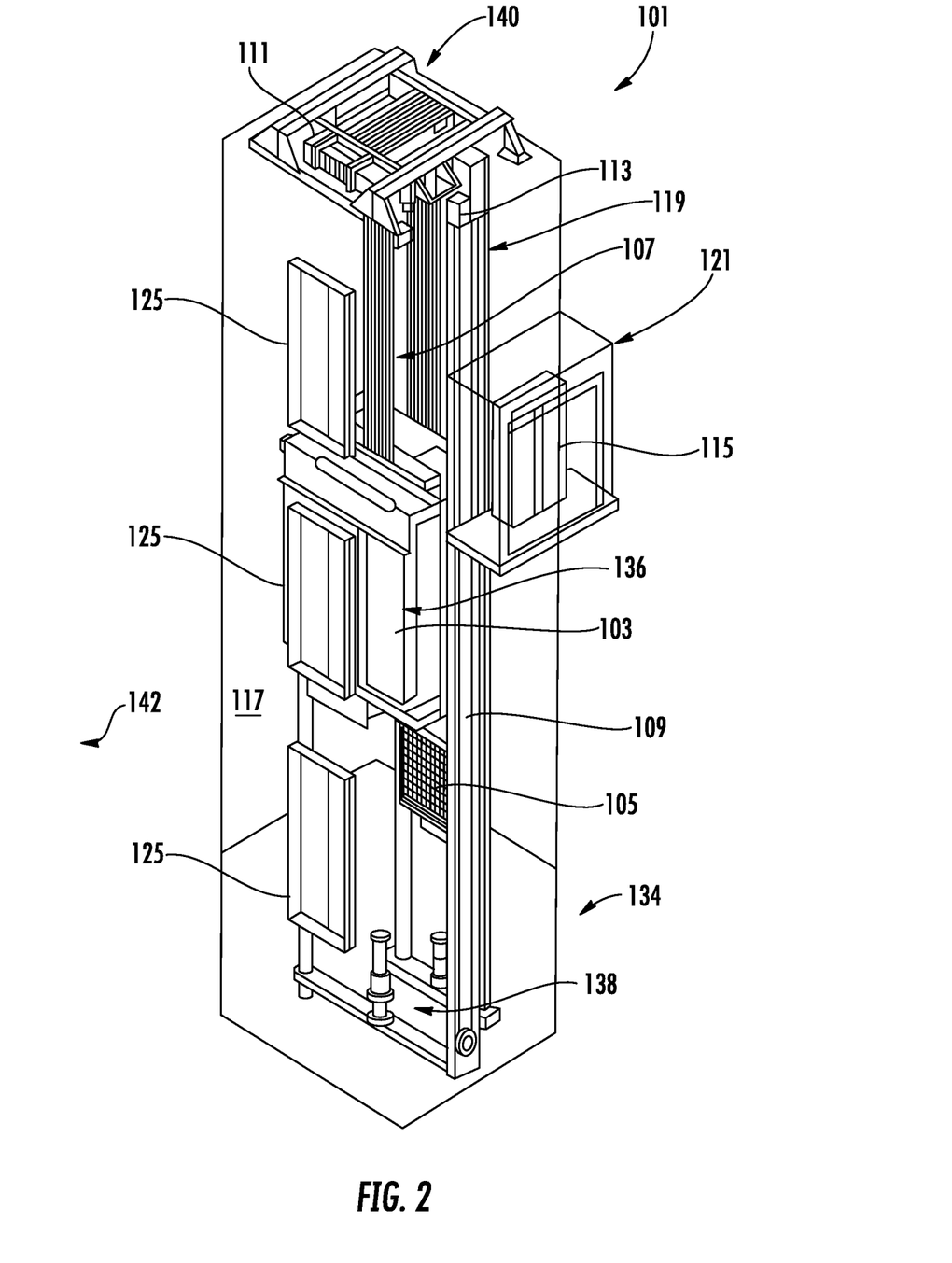
FIG. 2 is a schematic illustration of an elevator system that may employ various embodiments of the present disclosure.

FIG. 2 is a perspective view of an elevator system 101 including an elevator car 103, a counterweight 105, one or more load bearing members 107, a guide rail 109, a machine 111, a position encoder 113, and an elevator controller 115. The elevator system 101 includes examples of various equipment components 25 of FIG. 1 and predetermined service locations (e.g., a general onsite location 134, at various landings 125, at a location 136 within elevator car 103, at a location 140 proximate to machine 111, at a pit location 138, in controller room 121, etc.), where the elevator controller 115 is an example of the equipment controller 26 of FIG. 1. A location that cannot be determined or is confirmed as being external to the onsite location 134 may be generally designated as an offsite location 142. For instance, the onsite location 134 can be within a building/structure that includes the elevator system 101, while the offsite location 142 is external to the building/structure that includes the elevator system 101.

In the example of FIG. 2, the elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109. The load bearing members 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include a motor or similar driving mechanism and an optional braking system. In accordance with embodiments of the disclosure, the machine 111 is configured to include an electrically driven motor. The power supply for the motor may be any power source, including a power grid, which, in combination with other components, is supplied to the motor. Although shown and described with a rope-based load bearing system, elevator systems that employ other methods and mechanisms of moving an elevator car within an elevator shaft, such as hydraulics, ropeless, or any other methods, may employ embodiments of the present disclosure. FIG. 2 is merely a non-limiting example presented for illustrative and explanatory purposes.

Figure 3:
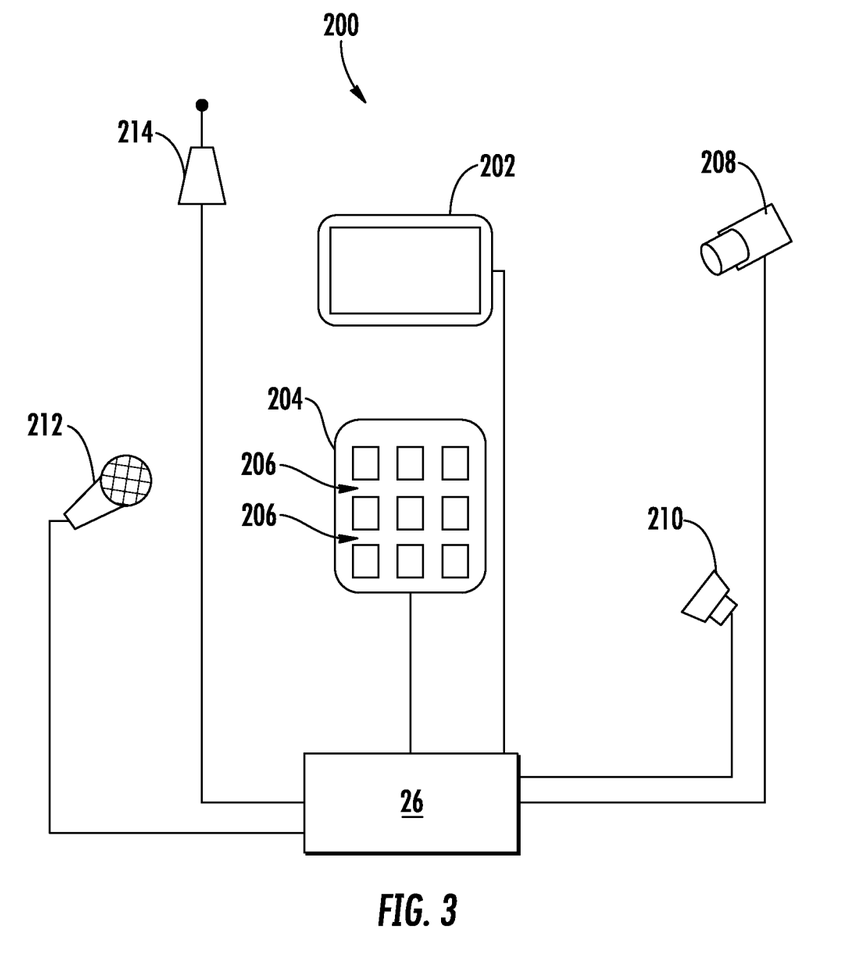
FIG. 3 is a schematic illustration of a user interface of an equipment controller in accordance with an embodiment of the present disclosure.

FIG. 3 depicts an example of user interfaces 200 that can be used to generate a location proximity indicator and/or process a response to the location proximity indicator. One or more instances of the user interfaces 200 can be installed at each site 34, 36 to serve various purposes during normal operation and to support proximity detection and maintenance operations. For instance, the user interfaces 200 can be located in whole or in part within the elevator car 103 of FIG. 2 as part of an elevator control interface. Further, the user interfaces 200 can be located at one or more of the landings 125 of FIG. 2, in controller room 121 of FIG. 2, and/or at other locations. The user interface 32 of the service tool 22 of FIG. 1 can include similar elements as the user interfaces 200 to gather different types of audio/visual inputs and produce different types of audio/visual outputs. The user interfaces 200 can provide various inputs and/or outputs to equipment controller 26 of FIG. 1. For example, the user interfaces 200 can include a display 202, an input interface 204 including a plurality of buttons 206, a camera 208, a speaker 210, and/or a microphone 212. An antenna 214 or other communication interface can be used to establish various types of wireless communication, such as the communication pathway 30 of FIG. 1. In some embodiments, the antenna 214 enables establishment of one or more local-only wireless links with the service tool 22 of FIG. 1. For instance, local-only wireless link protocols such as Bluetooth®, Wi-Fi, or NFC may have a limited communication range such that establishing such a communication channel ensures that the service tool 22 and the location of the user interfaces 200 are in close physical proximity to each other.

The user interfaces 200 can be used to output or receive various types of encoded information as a location proximity indicator. The location proximity indicator can be established as a single code or sequence of codes presented to a user of the service tool 22 of FIG. 1 to confirm that the user of the service tool 22 is physically present at a predetermined location, such as next to the user interfaces 200 of the elevator car 103, landings 125, controller room 121 of FIG. 2, and/or other known location where proximity can be verified through any combination of buttons, touch screen interactions, audio, and/or visual interactions. For instance, a location proximity indicator can be a sequence to be entered through user interface 32 and/or user interface 200, such as a password entered through buttons 206. The sequence may be fixed for a period of time and periodically changed, for instance, a new sequence each day or each week. For example, changed from "1234" to "5624" to "963", etc. The sequence may be determined based on information received from a remote source, such as from the remote server 24 of FIG. 1. In other embodiments, when access to the remote server 24 is unavailable, the sequence can be determined pseudo-randomly using a time-of-day, day-of-year, or other value as a seed for pseudo-random sequence generation. For instance, the equipment controller 26 of FIG. 1 and the service tool 22 of FIG. 1 can use a same sequence generation/authentication function and by applying a same seed value, both produce an expected sequence of symbols to match and confirm physical proximity.

Various methods and combinations of data entry can be used to confirm that the user of the service tool 22 of FIG. 1 is at a predetermined location of the user interface 200 (e.g., within elevator car 103 of FIG. 2) by making visual or audio indicators available and confirming that an expected response to the indicators is received. For example, a sequence of numbers (e.g., floor level indicators) can light up individually or in groups/patterns of buttons 206, and the user of service tool 22 may be prompted to enter the sequence through the service tool 22 or by pressing one or more of the buttons 206 (e.g., observe and enter the sequence) that interface with the equipment controller 26 of FIG. 1. Alternatively, a numerical sequence can be displayed on the user interface 32 to be entered in order through the buttons 206 and/or other input interface 204 readable by the equipment controller 26 of FIG. 1. In some embodiments, the display 202 is touch sensitive and configured to receive touch-based user input. Further, a sequence can be split for partial entry on the user interface 32 and partial entry on the user interface 200. Various images can also be used for proximity verification, such as displaying an image on display 202 and prompting the user of the service tool 22 for one or more identifying image features (e.g., what shape and color appear). Further, bar codes or quick response (QR) codes can be generated as a location proximity indicator provided as a code to be captured as image data through camera 208 and/or a camera of the service tool 22. By prompting with a visual indicator that is human readable or machine readable, whether displayed on a user interface 200 of the site 34, 36 or on the user interface 32 of the service tool 22, the user of the service tool 22 can verify proximity through an expected response or interaction.

As another example, a location proximity indicator can be an audio code to be captured as audio data or an audio prompt to elicit the expected response through user interfaces 32, 200. For instance, a sequence of tones can be output by speaker 210 and captured/recorded using a microphone of the service tool 22. The service tool 22 can playback the tones to microphone 212 or otherwise transmit a copy or summary of the tones to the equipment controller 26, e.g., in an encoded transmission through antenna 214. Further, the audio data can be in the form of a question seeking a user to enter a response through user interfaces 32, 200. In the example of the elevator car 103 of FIG. 2, buttons 206 that are typically used to select a floor can be used as indicators, with the user prompted through the display 202 or speaker 210 within the elevator car 103 to say into the microphone 212 (or otherwise input) how many of the buttons 206 are illuminated or identifying which of the buttons 206 are illuminated. Alternatively, audio or touch-based inputs of the user interface 32 of the service tool 22 can be used to capture a user response indicating how many or which of the buttons 206 are illuminated.

Other examples of information exchanged to establish a location proximity indicator and a corresponding response can include location information determined, for instance, based on internet protocol (IP) address, global positioning system (GPS) coordinates, and the like. Further, for heightened security, two or more forms of location proximity indicator responses may be needed. For example, a combination of audio and visual interactions may be needed to positively determine that an expected response match exists. Further, if no response is received during a timeout period, multiple attempts to convey the location proximity indicator may be made in case damage or other conditions prevent one or more proximity detection techniques from being effective. For example, if speaker 210 is malfunctioning, image data and/or sequences of buttons 206 can be used as a backup proximity detection technique. In some embodiments, the service tool 22 is determined to be located remote of the predetermined service location based on an absence of the response to the location proximity indicator within a predetermined timeout period. Location information can be determined periodically to confirm the current location of the service tool 22. For instance, once proximity is determined as being "local", the service tool 22 may be required to confirm its location every hour or at a different interval until the service tool 22 is determined to be "remote".

Figure 4:
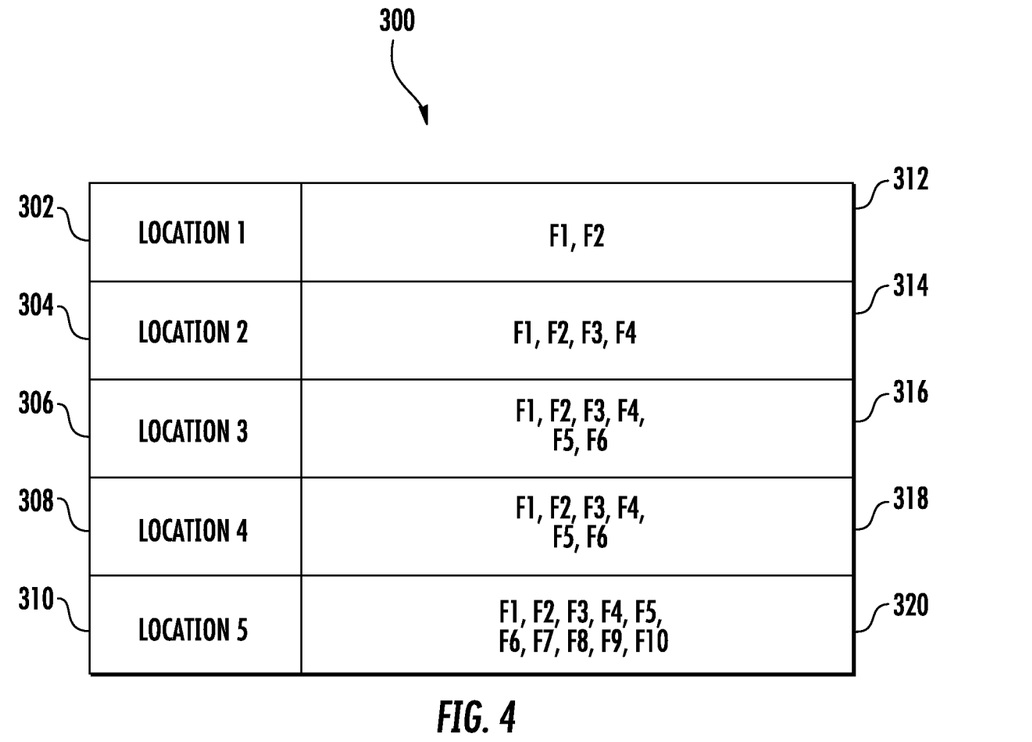
FIG. 4 is a schematic illustration of a location-based function availability map in accordance with an embodiment of the present disclosure.

FIG. 4 depicts an example of a location-based function availability map 300 according to an embodiment. Multiple copies of the location-based function availability map 300 can exist in the equipment service system 20 of FIG. 1. For instance, the remote server 24 may provide the service tool 22 with a copy of the location-based function availability map 300 based on the actual or planned location of the service tool 22. In some embodiments, the service tool 22 can receive a copy the location-based function availability map 300 from the equipment controller 26 as part of an authentication process. The location-based function availability map 300 can be customized for each site 34, 36 of FIG. 1. In the example of FIG. 4 the location-based function availability map 300 includes a list five predetermined service locations 302, 304, 306, 308, 310 with corresponding sets of available functions 312, 314, 316, 318, 320. The available functions 312-320 can expand or contract depending on the predetermined service locations 302-310. For instances, functions F1 and F2 may be monitoring functions available from all predetermined service locations 302-310, while functions F3, F4, F5, F6, F7, F8, F9, and F10 are control functions that are all blocked at predetermined service location 302 and selectively blocked at predetermined service locations 304-308. Some locations can have a common set of functions available, such as predetermined service locations 306 and 308 with matching sets of available functions 316, 318.

As one example with respect to FIGS. 1 and 2, the predetermined service location 302 can be the offsite location 142, and the set of available functions 312 (F1, F2) can include monitoring the status of the elevator system 101. The predetermined service location 304 can be the onsite location 134 at site 34 or 36, and the set of available functions 314 can include monitoring functions (F1, F2) and limited change control access (F3, F4) of the elevator system 101. The predetermined service location 306 can be location 136 within elevator car 103, and the set of available functions 316 can include the set of available functions 314 plus additional change control access (F5, F6). The predetermined service location 308 can be the pit location 138, and the set of available functions 318 can be the same as the set of available functions 316. The predetermined service location 310 can be location 140 proximate to machine 111, and the set of available functions 320 can include the set of available functions 318 plus further change control access (F7, F8, F9, F10). It will be understood that the location-based function availability map 300 of FIG. 4 is one example, and many variations of different locations and functions are contemplated. Assignments between functions and locations can be made based on safety aspects and other considerations. For instance, access to monitoring functions can include determining whether the elevator car 103 is empty, a location of the elevator car 103, a motion status of the elevator car 103, a door opened/closed status of the elevator car 103, and other such status information. Access to control aspects of the machine 111 may be provided, for example, at location 140 proximate to machine 111 or at the controller room 121 but may be blocked while at location 136 within elevator car 103 or at the pit location 138 to reduce a risk of injury to maintenance personnel while in the elevator car 103 or below the elevator car 103. In the pit location 138, a service bypass function may be added as an interlock to other control functions to ensure that the user of the service tool 22 is fully aware of any potential safety issues while controlling aspects of the elevator system 101. Control of certain functions within the elevator car 103 may be limited to the location 136 within elevator car 103, such as lighting controls and/or audio controls.

As further examples of location-based functions for the elevator system 101, a learn-run function that runs the elevator car 103 through an entire set of floors to learn floor locations can be limited to where the service tool 22 is near a system controller, such as at location 140 proximate to machine 111 or at the controller room 121. A parameter change function to modify configuration settings in the elevator system 101 may be permitted from any local location identified as a general onsite location 134, such as at various landings 125, at location 136 within elevator car 103, at location 140 proximate to machine 111, at pit location 138, in controller room 121, and the like. However, some parameter change functions can be further constrained, such as door parameter modifications that may only be allowed in the elevator car 103, on top of the elevator car 103, or at a controller location. As a further example, drive parameters may only be modified when near a corresponding controller, such as elevator controller 115. An uncontrolled motion test that bypasses some safety signals to exercise safety functions associated with motion of the elevator car 103 while car doors are open may require that the service tool 22 is at the general onsite location 134 but not in the elevator car 103, on top of the elevator car 103, or in the pit location 138. Speed test functions to change some safety margins to exercise safety functions associated with speed checks may require that the service tool 22 is at the general onsite location 134 but not in the elevator car 103, on top of the elevator car 103, or in the pit location 138. A door learn run function that opens and closes doors of the elevator car 103 to learn the nominal performance, such as force needed, may require proximity to doors of the elevator car 103 at location 136 within the elevator car 103 or at a corresponding landing 125 with the elevator car 103 present to ensure that the doors are not obstructed. Other such location-based functionality constraints will be apparent to those of skill in the art.

Figure 5:
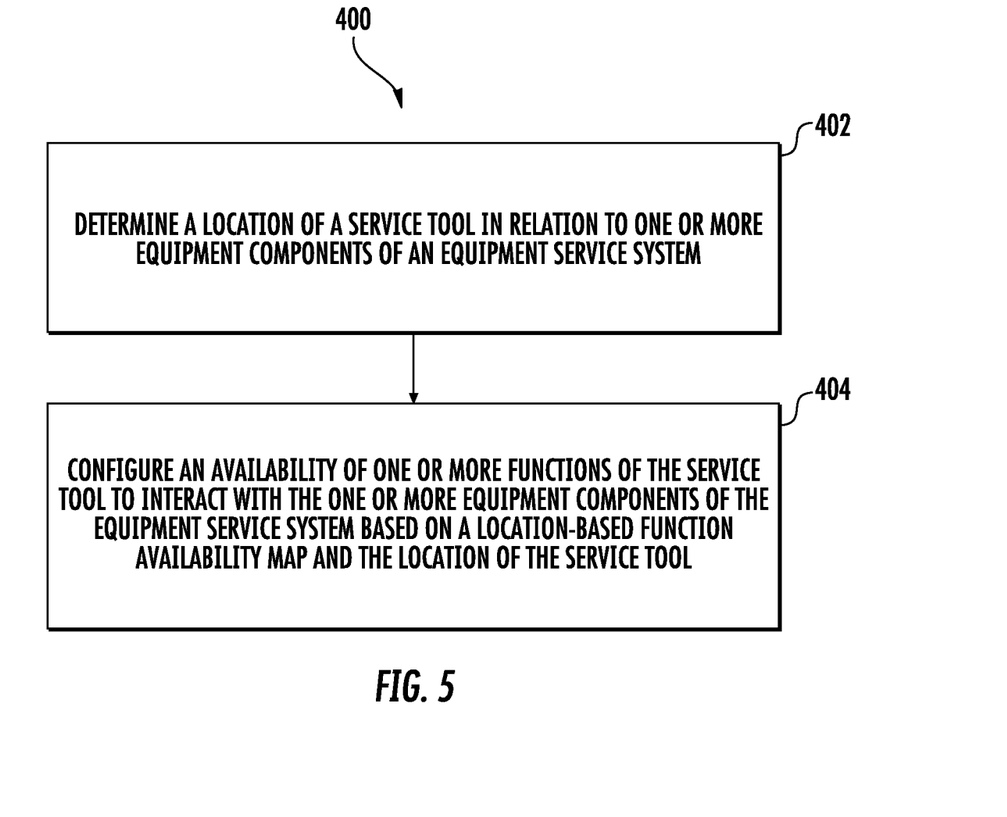
FIG. 5 is a flowchart illustrating a method of service tool function availability adjustment in accordance with an embodiment of the present disclosure.

FIG. 5 depicts a flow process 400 that can be performed by the service tool function availability adjustment system 10 of FIG. 1 as shown and described herein and/or by variations thereon. Various aspects of the flow process 400 can be carried out using one or more sensors, one or more processors, and/or one or more machines and/or controllers. For example, some aspects of the flow process involve sensors (e.g., GPS, cameras, microphones, etc.), as described above, in communication with a processor or other control device and transmit detection information thereto. The flow process 400 is described in reference to FIGS. 1-5.

At block 402, at least one processor 38, 40, 42 of the service tool function availability adjustment system 10 (e.g., within service tool 22) determines a location of the service tool 22 in relation to one or more equipment components 25 of an equipment service system 20. The service tool 22 can be determined as being at one of the predetermined service locations 302-310 if the service tool 22 is within a predetermined radius of one of the predetermined service locations 302-310 or an within an area defined as one of the predetermined service locations 302-310. For example, if GPS coordinates of the service tool 22 match known coordinates of site 36, the service tool 22 can be determined as being onsite at site 36 (e.g., at onsite location 134). If the service tool 22 is unable to communicate with equipment controller 26 on communication pathway 30 but can communicate through communication pathways 28 and 31, the service tool 22 may be determined to be offsite (e.g., an offsite location 142) unless a secondary proximity confirmation is detected based on an expected response to a location proximity indicator. The determined location can be verified through one or more of: a sequence to be entered through a user interface, a code to be captured as image data, a code to be entered through the service tool, an audio code to be captured as audio data, an audio prompt to elicit an expected response, communication using a local-only wireless link, and exchanged location information.

At block 404, at least one processor 38, 40, 42 of the service tool function availability adjustment system 10 configures an availability of one or more functions of the service tool 22 to interact with one or more equipment components 25 of the equipment service system 20 based on the location of the service tool 22. For instance, the availability of one or more functions of the service tool 22 can be enabled or disabled based one determining that the service tool 22 is at one of the predetermined service locations 302-310 defined in the location-based function availability map 300. The one or more functions can include at least one control function (e.g., F3-F10 in sets of available functions 314-320) of the one or more equipment components 25 and at least one monitoring function (e.g., F1, F2 in sets of available functions 312-320) of the one or more equipment components 25.

At least one processor 38, 40, 42 of the service tool function availability adjustment system 10 can modify the availability of the one or more functions of the service tool 22 based on determining that the service tool 22 is not at a predetermined service location. For instance, the availability of functions F3 and F4 is blocked or otherwise removed when the service tool 22 transitions to predetermined service location 302. The location-based function availability map 300 can define the availability of the one or more functions of the service tool 22 (e.g., in sets of available functions 312-322) for a plurality of predetermined service locations 302-310, and the availability of the one or more functions of the service tool 22 can be modified based on the location-based function availability map 300 and a current location of the service tool 22. The one or more functions of the service tool 22 can provide access to one or more function of an equipment controller 26 of the equipment service system 20. Process 400 can be repeated periodically to confirm whether a change in location of the service tool 22 necessitates a change in function availability. For example, the process 400 can be repeated every N minutes, hourly, or at any other suitable period. In some embodiments, the process 400 repeats at a faster rate when the service tool 22 transitions from an offsite location 142 to an onsite location 134.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A service tool function availability adjustment system comprising:
   a storage medium operable to store a location-based function availability map; and
   at least one processor configured to:
      determine a location of a service tool in relation to one or more equipment components of an equipment service system; and
      configure an availability of one or more functions of the service tool to interact with the one or more equipment components of the equipment service system based on the location-based function availability map and the location of the service tool.

2. The service tool function availability adjustment system set forth in claim 1, wherein the one or more functions comprise at least one control function of the one or more equipment components and at least one monitoring function of the one or more equipment components.

3. The service tool function availability adjustment system set forth in claim 1, wherein the location-based function availability map defines the availability of the one or more functions of the service tool for a plurality of predetermined service locations.

4. The service tool function availability adjustment system set forth in claim 1, wherein the one or more functions of the service tool provide access to one or more functions of an equipment controller of the equipment service system.

5. The service tool function availability adjustment system set forth in claim 4, wherein the equipment controller is an elevator controller, and the one or more equipment components comprise one or more elevator components.

6. The service tool function availability adjustment system set forth in claim 4, wherein the service tool and the equipment controller establish communication using a wireless link.

7. The service tool function availability adjustment system set forth in claim 4, wherein the service tool blocks access to one or more control functions of the one or more equipment components when the service tool is determined to be at an offsite location with respect to the one or more equipment components.

8. The service tool function availability adjustment system set forth in claim 4, wherein the equipment controller verifies the location of the service tool.

9. The service tool function availability adjustment system set forth in claim 8, wherein the location is verified through one or more of: a sequence to be entered through a user interface, a code to be captured as image data, a code to be entered through the service tool, an audio code to be captured as audio data, an audio prompt to elicit an expected response, communication using a local-only wireless link, and exchanged location information.

10. The service tool function availability adjustment system set forth in claim 1, wherein a remote server verifies the location of the service tool.

11. A method of service tool function availability adjustment comprising:
   determining a location of a service tool in relation to one or more equipment components of an equipment service system; and
   configuring an availability of one or more functions of the service tool to interact with the one or more equipment components of the equipment service system based on the location of the service tool, wherein a location-based function availability map defines the availability of the one or more functions of the service tool for a plurality of predetermined service locations.

12. The method set forth in claim 11, wherein the one or more functions comprise at least one control function of the one or more equipment components and at least one monitoring function of the one or more equipment components.

13. The method set forth in claim 11, wherein the one or more functions of the service tool provides access to one or more functions of an equipment controller of the equipment service system.

14. The method set forth in claim 13, wherein the equipment controller is an elevator controller, and the one or more equipment components comprise one or more elevator components.

15. The method set forth in claim 13, wherein the service tool and the equipment controller establish communication using a wireless link.

16. The method set forth in claim 13, wherein the service tool blocks access to one or more control functions of the one or more equipment components when the service tool is determined to be at an offsite location with respect to the one or more equipment components.

17. The method set forth in claim 13, wherein the equipment controller verifies the location of the service tool.

18. The method set forth in claim 17, wherein the location is verified through one or more of: a sequence to be entered through a user interface, a code to be captured as image data, a code to be entered through the service tool, an audio code to be captured as audio data, an audio prompt to elicit an expected response, communication using a local-only wireless link, and exchanged location information.

19. The method set forth in claim 11, wherein a remote server verifies the location of the service tool.

20. A method of service tool function availability adjustment comprising:
   determining a location of a service tool in relation to one or more equipment components of an equipment service system; and
   configuring an availability of one or more functions of the service tool to interact with the one or more equipment components of the equipment service system based on the location of the service tool, wherein the one or more functions of the service tool provides access to one or more functions of an equipment controller of the equipment service system, and the equipment controller verifies the location of the service tool, and further wherein the location is verified through one or more of: a sequence to be entered through a user interface, a code to be captured as image data, a code to be entered through the service tool, an audio code to be captured as audio data, an audio prompt to elicit an expected response, communication using a local-only wireless link, and exchanged location information.

* * * * *